US010731627B1

(12) United States Patent
Vanderelli et al.

(10) Patent No.: US 10,731,627 B1
(45) Date of Patent: Aug. 4, 2020

(54) LOW WIND GENERATOR WITH INTERNAL RECHARGEABLE POWER

(71) Applicants: Timm A Vanderelli, Ligonier, PA (US); Rodney A Carter, Paris, TN (US)

(72) Inventors: Timm A Vanderelli, Ligonier, PA (US); Rodney A Carter, Paris, TN (US)

( * ) Notice: Subject to any disclaimer, the term of this patent is extended or adjusted under 35 U.S.C. 154(b) by 0 days.

(21) Appl. No.: 16/595,014

(22) Filed: Oct. 7, 2019

(51) Int. Cl.
*F03D 1/06* (2006.01)
*F21S 9/02* (2006.01)
*H02K 7/18* (2006.01)

(52) U.S. Cl.
CPC ............ *F03D 1/0666* (2013.01); *F21S 9/026* (2013.01); *H02K 7/1838* (2013.01)

(58) Field of Classification Search
CPC ....... F03D 1/0666; F21S 9/026; H02K 7/1838
See application file for complete search history.

(56) References Cited

U.S. PATENT DOCUMENTS

| | | |
|---|---|---|
| 4,476,422 A | 10/1984 | Kirschbaum |
| 4,734,658 A | 3/1988 | Bohan |
| 5,672,925 A | 9/1997 | Lipo |
| 6,020,725 A | 2/2000 | Roberts |
| 7,964,981 B2 | 6/2011 | Tsao |
| 8,502,466 B2 | 8/2013 | Liu |
| 9,416,774 B2 | 8/2016 | Jorden |
| 2008/0088200 A1* | 4/2008 | Ritchey ................. H02K 16/00 310/268 |
| 2009/0133867 A1* | 5/2009 | Kuckes ............... E21B 41/0085 166/65.1 |
| 2011/0089872 A1* | 4/2011 | Vanderelli ............ H02K 1/2793 318/400.3 |
| 2011/0115327 A1* | 5/2011 | Pan ........................ H02K 21/24 310/156.36 |
| 2016/0108890 A1* | 4/2016 | Garcia .................. F03D 1/0666 700/287 |
| 2016/0208772 A1* | 7/2016 | Dermitzakis .......... F03D 1/0625 |
| 2017/0133897 A1* | 5/2017 | Ritchie .................. H02K 21/24 |
| 2018/0187447 A1* | 7/2018 | Gharabegian ......... H01L 31/042 |

* cited by examiner

*Primary Examiner* — Viet P Nguyen

(57) ABSTRACT

The invention is a generator that will recharge its internal storage from as low as a five mile-per-hour wind without typical speed multiplying methods such as gears and pulleys. The invention creates alternating currents from rotating magnets by aligning the polarity of each magnet face in the same direction and wiring opposing sets of coils in series as a single phase. These series-connected sets are wired out-of-phase with each other to produce alternating currents. When mounted in a breezy location, the invention will silently provide reliable and consistent energy to power its internal devices.

4 Claims, 9 Drawing Sheets

Figure 6

Outdoor Real-life Rechargeable Power Source (39) Test Data

| test date | Volts- L Unit1 | Volts- L Unit2 | Volts- Wx Unit3 | Volts- L Unit4 | Volts- L Unit5 | Volts- L Unit6 | Volts- L Unit7 |
|---|---|---|---|---|---|---|---|
| December 1, 2018 | 1.33 | 1.55 | 2.73 | 1.33 | 1.33 | 1.33 | 1.33 |
| January 1, 2019 | 1.32 | 1.72 | 2.7 | 1.35 | 1.26 | 1.38 | 1.35 |
| February 1, 2019 | 1.32 | 1.75 | 2.75 | 1.32 | 1.32 | 1.35 | 1.36 |
| March 1, 2019 | 1.36 | 1.74 | 2.74 | 1.28 | 1.33 | 1.37 | 1.38 |

LOW WIND GENERATOR WITH INTERNAL RECHARGEABLE POWER

CROSS-REFERENCE TO RELATED APPLICATIONS

This application claims the benefit of provisional patent application Ser. No. U.S. 62/766,252 filed Oct. 9, 2018 by the present inventors.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not applicable

TECHNICAL FIELD

The present invention relates to generators that utilize wind as a source of power, and more specifically winds of as little as 5 miles an hour.

BACKGROUND AND PRIOR ART

The following is tabulation of some prior art that presently appears relevant:

| U. S. Patents | | |
|---|---|---|
| Pat. No. | Issue Date | Patentee |
| U.S. 7,964,981 | June 21, 2011 | Tsao |
| U.S. 8,502,466 | August 6, 2006 | Liu |
| U.S. 8,848,404 | September 30, 2014 | Tan, et al. |
| U.S. 6,020,725 | February 1, 2000 | Roberts |
| U.S. 4,476,422 | October 9, 1984 | Kirschbaum |
| U.S. 4,734,658 | March 29, 1988 | Bohan, Jr. |
| U.S. 9,416,774 | August 16, 2016 | Jordan, Sr. |
| U.S. 5,672,925 | September 30, 1997 | Lipo, et al. |

BACKGROUND AND PRIOR ART

The patents listed above are distinguishable from the present invention by the following non-inclusive comparisons.

U.S. Pat. No. 7,964,981—Utilizes a Sterling engine to generate rotational energy to drive a generator and wind to provide cooling energy for Sterling engine. We teach electromagnetic generator powered by rotational energy from low winds.

U.S. Pat. No. 8,502,466—Liu teaches pulse generation using integrated circuit to step up voltage. We teach the use of inductor with feedback loop to step up voltage.

U.S. Pat. No. 8,848,404—Tan teaches conversion of DC to AC. We teach conversion of AC to DC.

U.S. Pat. No. 6,020,725—Roberts teaches the necessary inclusion of a reflex coil to minimize inductance. We teach a method utilizing maximum inductance.

U.S. Pat. No. 4,476,422—Anderson teaches a wind powered cooling system for heat dissipation of high power LEDs. We teach a low wind powered system for generating AC currents converted to DC.

U.S. Pat. No. 4,734,658—Kirschbaum teaches multi-pole, polyphase wiring of his coils. We teach single phase, multi-pole wiring of coils.

U.S. Pat. No. 4,734,658—Bohan teaches oscillator comprised of Field Effect Transistor (FET), a capacitor and a Megohm resistor. We teach an oscillator without any of the fore mentioned components.

U.S. Pat. No. 9,416,774—Jordon teaches energy generation using kinetic energy device with additional solar and wind generation with no disclosure of generator wiring or performance data. Jordan's invention is tied to electrical grid using tie-inverters for use in homes. We teach local generation and energy storage using wind.

SUMMARY AND ADVANTAGES

The differences between the above patents and the present invention is a new method for creating alternating currents from rotating magnets by aligning the polarity of each magnet face in the same direction, and wiring opposing sets of coils in series as a single phase. These series-connected sets are wired out-of-phase with each other to produce alternating currents.

None of the existing patented wind powered generators operate in low wind conditions. Our invention will generate useable currents in as low as 5 miles per hour winds. Furthermore, contemporary wind generators create noise and vibrations which contribute to environmental pollution and a reduction of generator efficiency.

BRIEF DESCRIPTION OF THE SEVERAL VIEWS OF THE DRAWINGS

In the drawings, closely related figures have the same number but different alphabetical suffixes for right and left.

FIG. 6 is a chart of test data collected from the first embodiment and second embodiment.

DETAILED DESCRIPTION OF THE INVENTION

The Low Wind Generator with Internal Rechargeable Power is a robust generator designed to produce AC currents converted from low wind energy. Magnets rotating in close proximity to two sets of series connected coils are positioned in opposition to each other, with each set connected out of phase with each other. Generated currents are full-wave rectified, filtered, and regulated before being directed into an internal rechargeable power source for storage and re-use.

Said full wave rectification allows clockwise or counter-clockwise rotation of the shaft to maintain a consistent positive and negative output polarity. Rechargeable power source provides energy to drive internal power-consuming circuits.

Two embodiments shown herein include a first embodiment configured as a self-powered weather station, including the utilization of a "Super Capacitor" for rechargeable power storage. A second embodiment is shown utilizing a light emitting diode (LED) for illumination at night, is powered by a rechargeable chemical battery.

Figure 1:
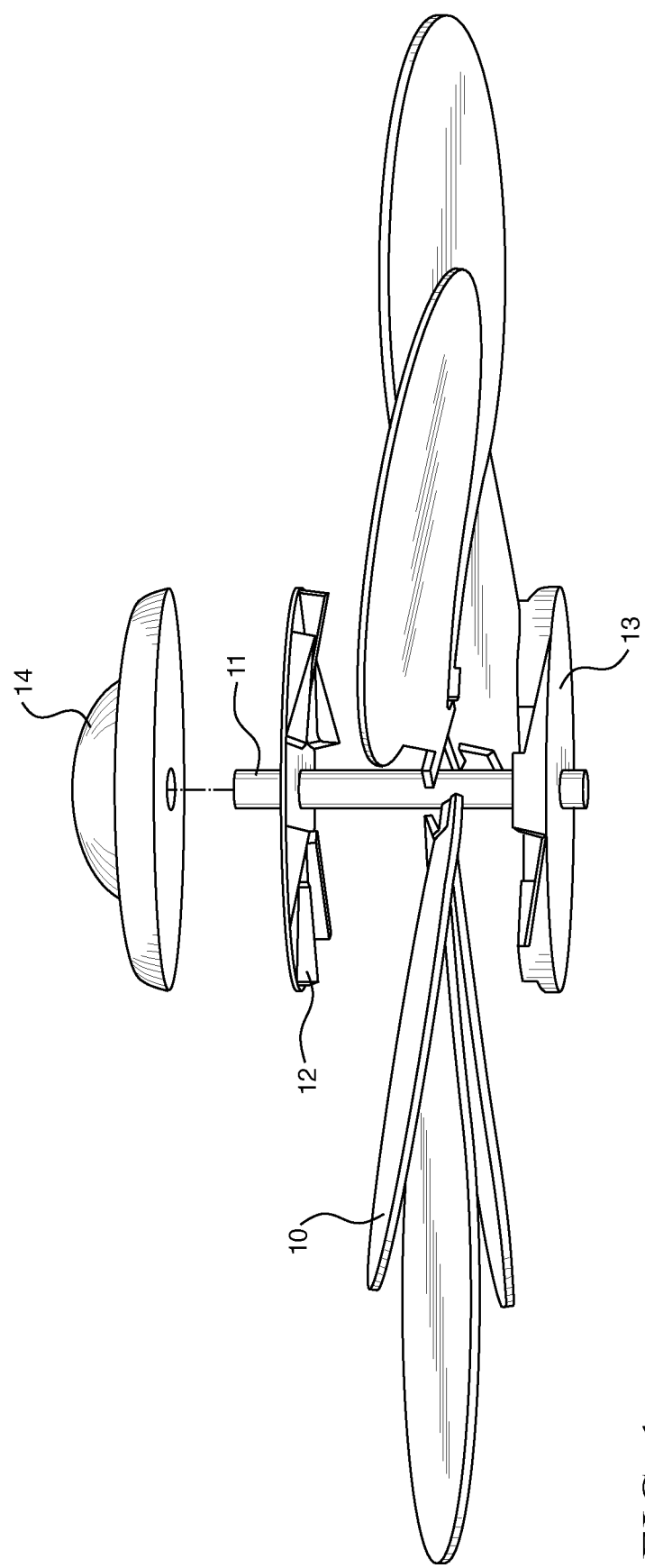
FIG. 1 is an exploded view of a preferred embodiment of a wind acceptor.

Shown in FIG. 1, six blades 10 spaced evenly and around a circumference at an eleven-degree offset comprise our wind acceptor. Blades 10 are fixed to shaft 11 by way of first blade lock 12 and second blade lock 13. Blade cap 14 enhances forward airflow into blades by its aerodynamic shape.

Figure 2:
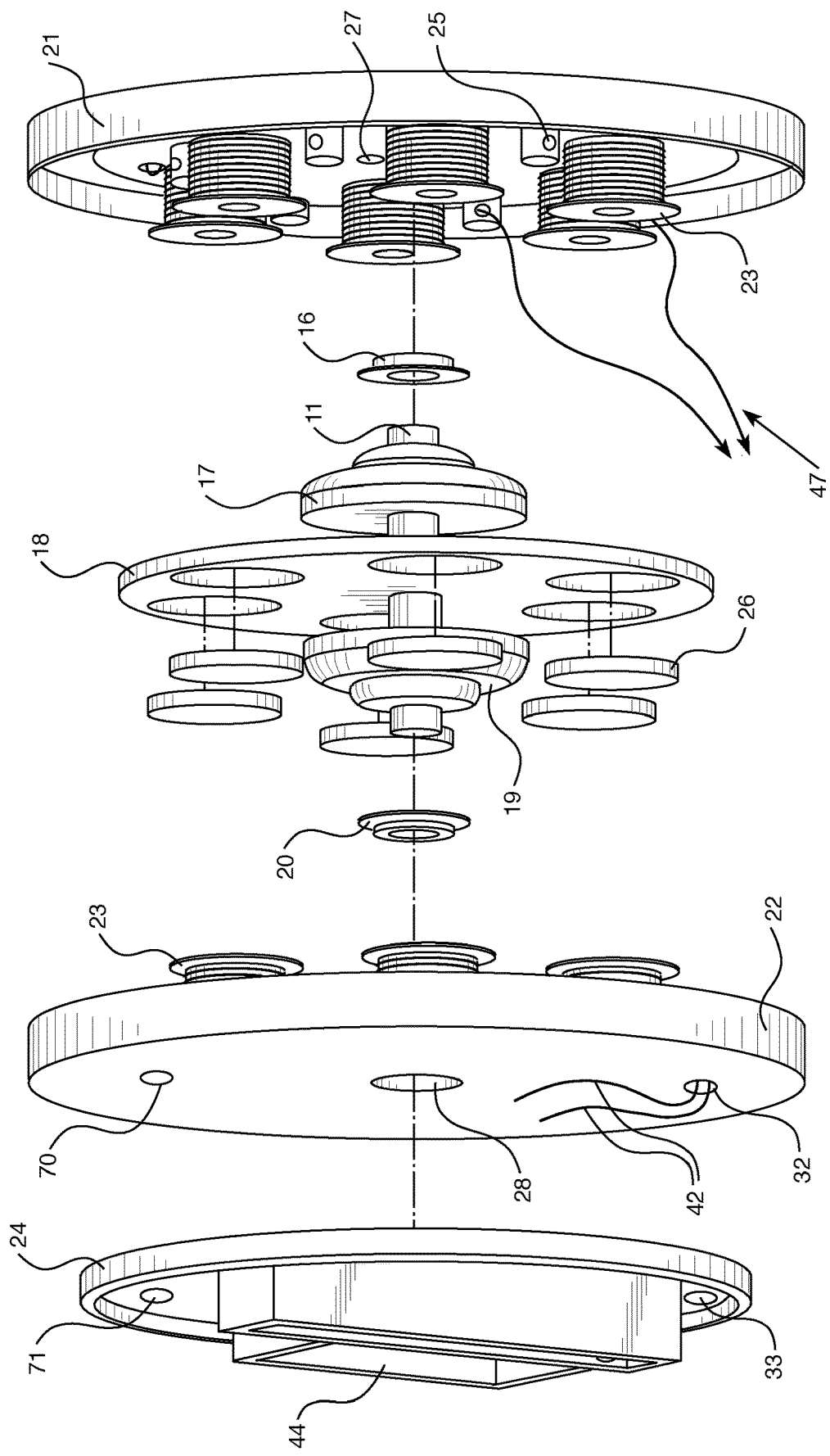
FIG. 2 shows an exploded view of a preferred embodiment of the low wind generator.

Shown in FIG. 2, shaft 11 passes through first bearing 16, into first shaft spacer 17, through and affixed to rotor 18, through second shaft spacer 19 and into second bearing 20. The first 16 and second 20 bearings are supported by first 21 and second 22 stator plates. Each stator plate has six cylindrically wound, ¾" diameter×½" long enamel-coated #26 copper wire coils 23, arranged equally spaced in an axial manner around the shaft 11 and are affixed to the first 21 and second 22 stator plates inside surfaces. Wire connections between each stator coil 23 are soldered, supported and wrapped around a plastic post 25 equally spaced between stator coils 23. Rotor 18 contains six ¾" diameter by ¼ thick Neodymium disc magnets 26 positioned equally between first and second stator coils 21, 22 where each magnet 26 is positioned to pass in-between each opposing stator coil pair during rotation.

Both first stator plate 21 and second stator plate support 22 rotor by way of first bearing 16 in hole 27 and second bearing 20 in hole 28. Stator plates 21, 22 are supported by body 30, as shown in FIGS. 3 and 4 are fixed into position facing each other with silicon adhesive for a firm and waterproof seal.

Figure 3:
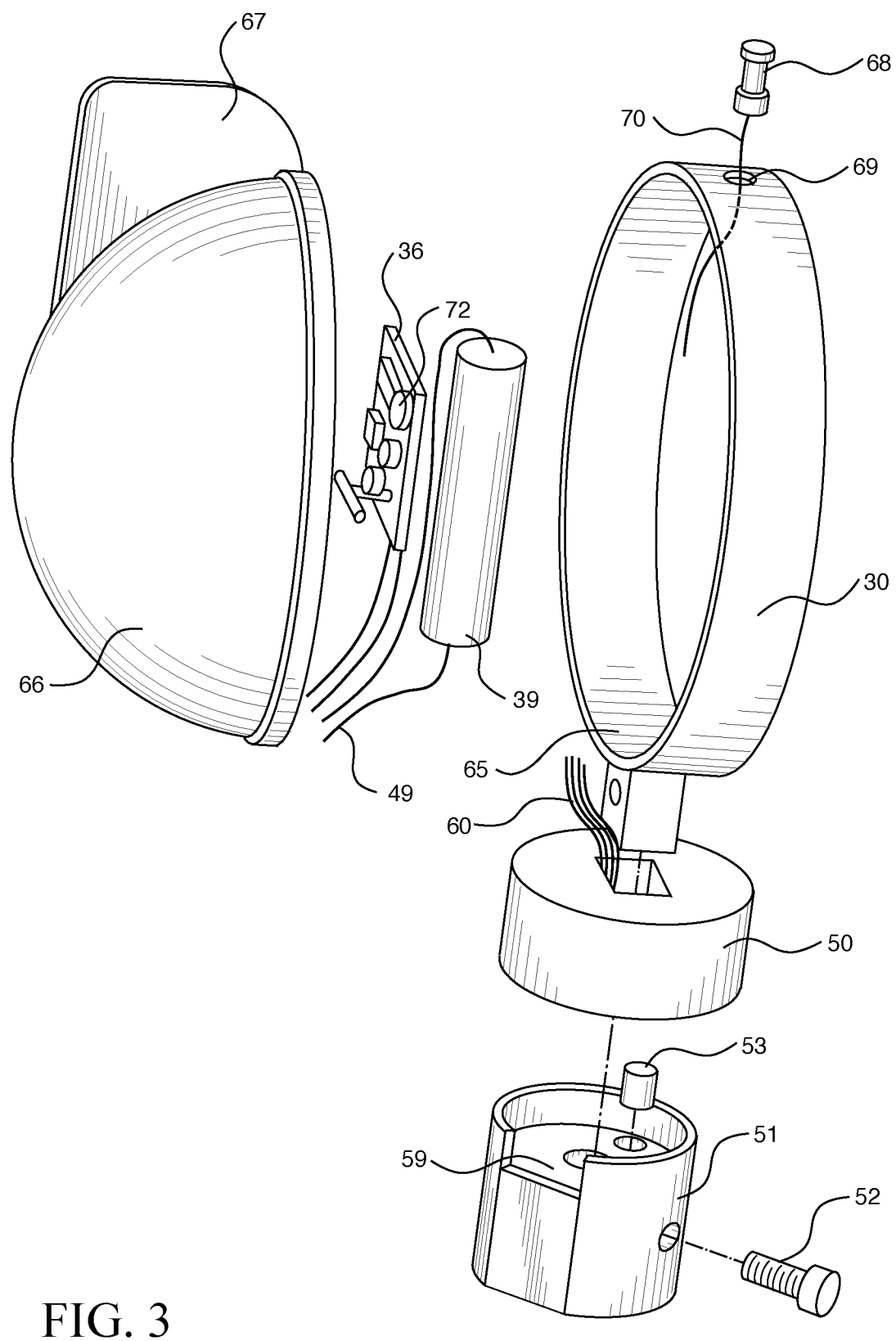
FIG. 3 is an exploded view of a first embodiment of a multi-sensor array configured as a weather station.
Figure 4:
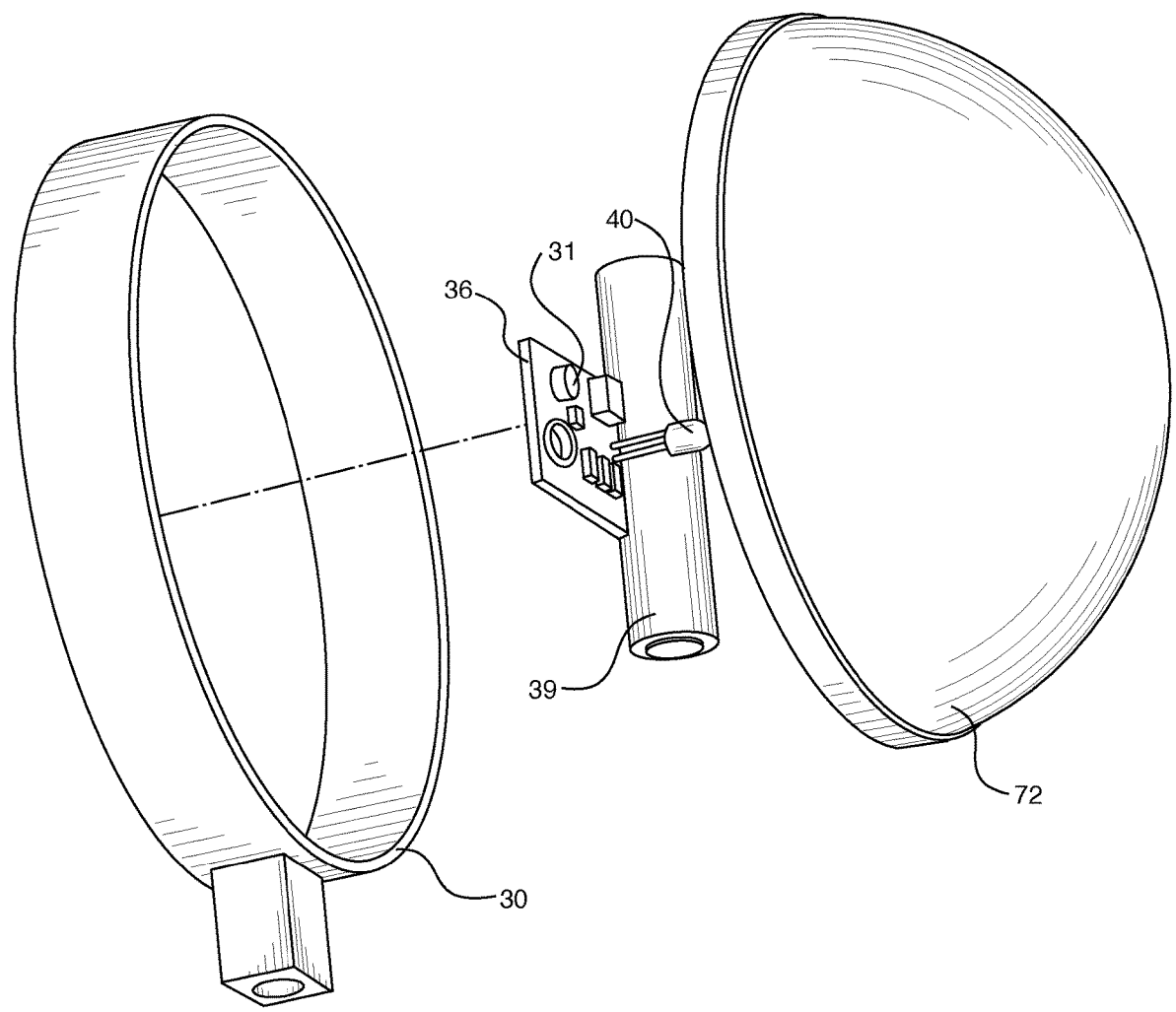
FIG. 4 is an exploded view of a second embodiment configured as a night-light.

Referring to FIG. 2, output wires from first 47 and second 42 stator coils are routed through hole 32 in second stator plate 22, through hole 33 in component plate 24 and connected into circuit board 36 as shown in FIG. 3. Rechargeable power source 39 as shown in FIG. 3 is fixed into compartment 44 of component plate 24, as shown in FIG. 2 with silicon adhesive and located next to said circuit board.

Shown in FIG. 3, wires 49 from rechargeable power source 39 connect to circuit board 36. Referring to FIG. 2, flat side of component plate 24 is fixed to outer side of second stator plate 22, preferably with silicon adhesive.

Figure 5:
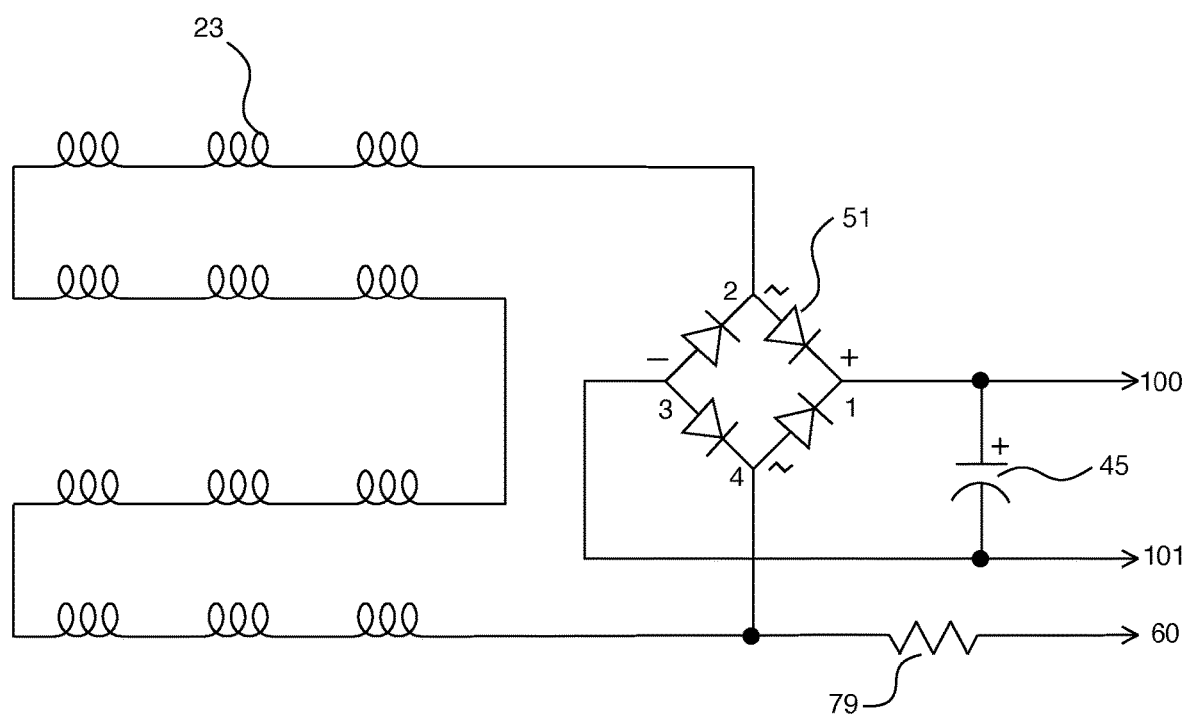
FIG. 5 is a schematic diagram of a preferred embodiment of the generator wiring and rectifier circuitry.
Figure 5A:
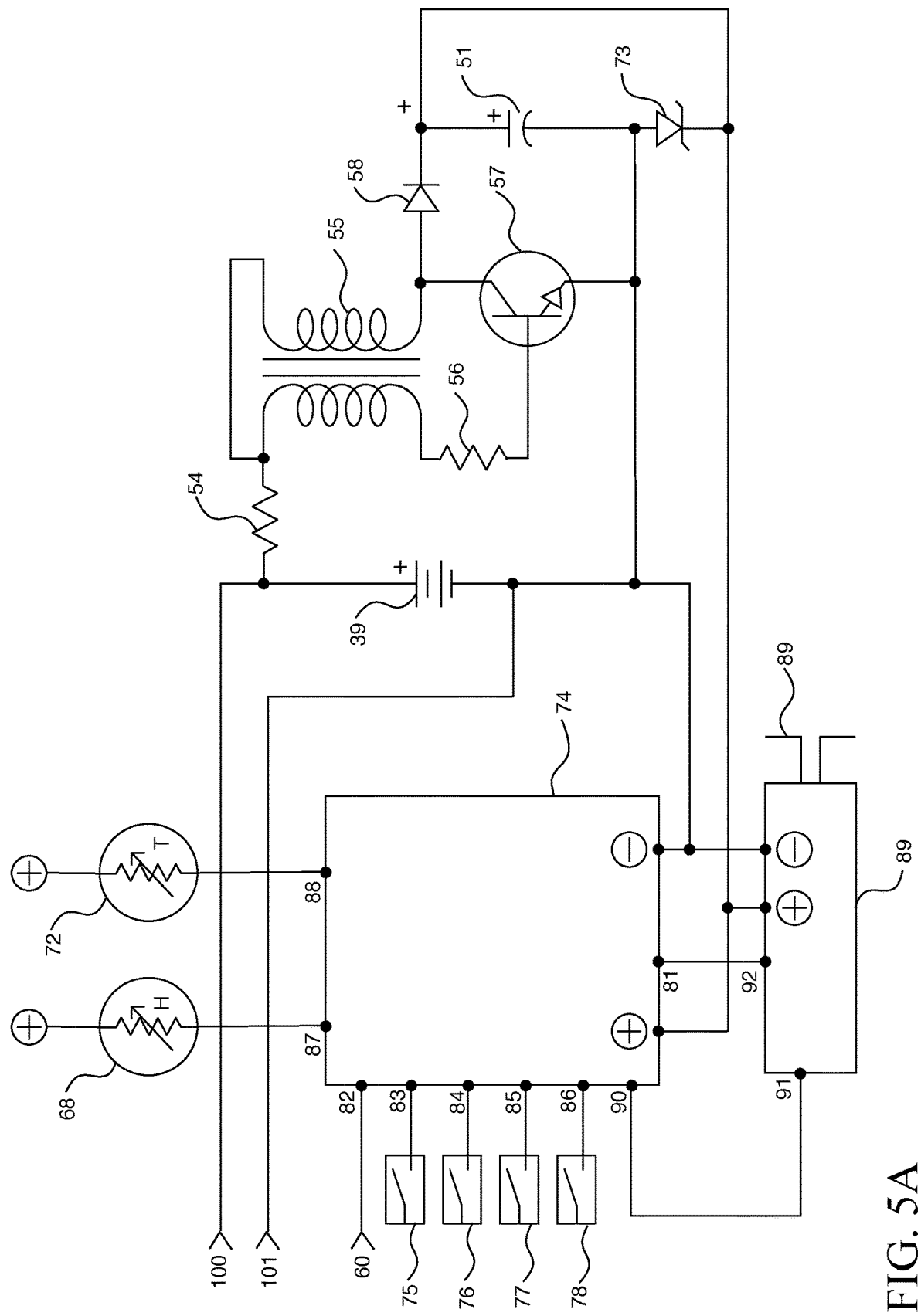
FIG. 5A shows a schematic diagram of humidity and temperature sensors, process controller, controller integrated circuit, RF module, blocking oscillator power supply and rechargeable storage of the first embodiment.
Figure 5B:
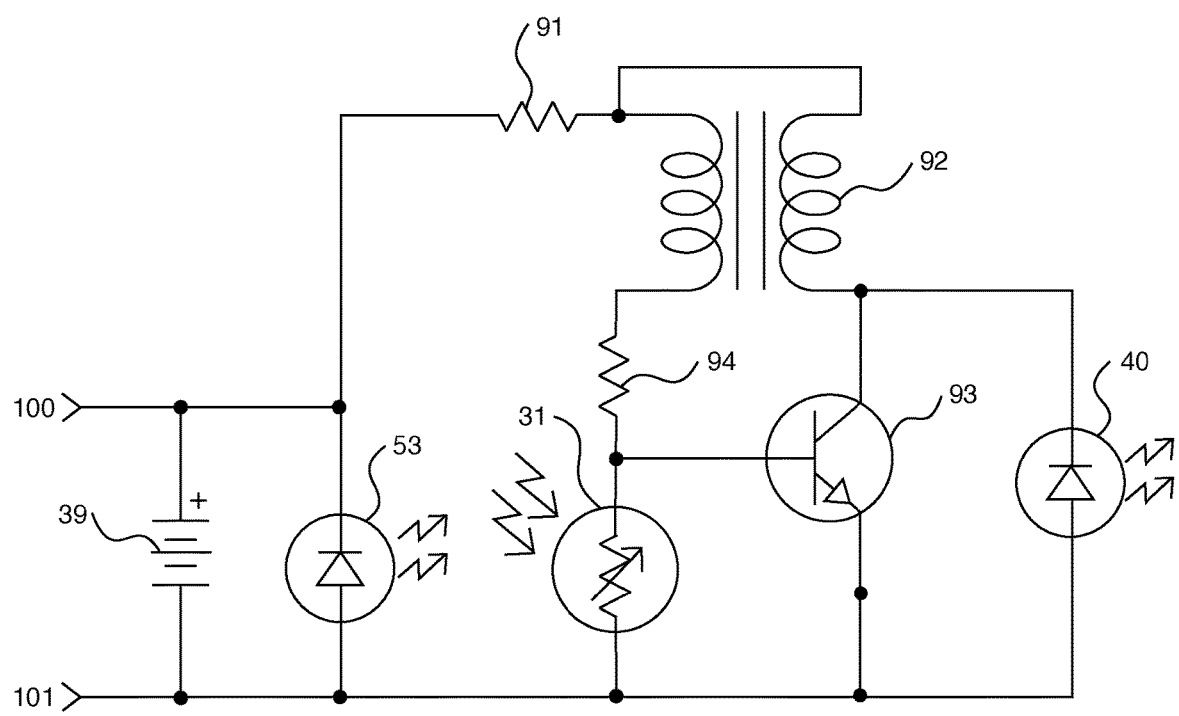
FIG. 5B is a schematic diagram of a blocking oscillator and rechargeable storage of the second embodiment.

Shown in FIGS. 5, 5A, 5B, the schematic diagram indicates connections of coils 23, bridge rectifier 51 and filter capacitor 45. Blades 10 face directly into a prevailing breeze. Wind activates said blades, which turn shaft 11. As shaft rotates, magnets 26 mounted on rotor 18 spin and induce currents into coils 23, which are located in very close proximity to magnet faces. All north poles of magnets 26 face first stator plates 21 and all south poles of said magnets face second stator plates 22. A first shaft spacer 17 and second shaft spacer 19, located on both sides of rotor 18 provide approximately a ⅟16" (+/−⅟64") air gap between magnet faces 26 and stator coil tops 23. Each stator coil 23 has an inductance measuring 0.6 mH and are wired in series. Said stator coils inductance total 3.6 mH per stator plate.

As shown in schematic diagram FIG. 5, first stator coils are connected in series and out of phase with second stator coils, thereby increasing output by combining currents from all stator coils. These single-phase AC currents are directed into and rectified by bridge rectifier 51, filtered by capacitor 45 and stored in rechargeable power source 39 for re-use by way of positive output connection 100 and negative output connection 101.

As shown in schematic diagram FIG. 3, the, first embodiment is configured as a wireless weather station. This embodiment includes a blocking oscillator circuit consisting of current limiter resistor 54, an oscillator coil 55, bias resistor 56, switching transistor 57, rectifier diode 58, filter capacitor 51 and 3.1 Volt zener regulator 73.

The oscillator coil 55 consists of 35 turns each for primary and secondary, wound using #30 copper enameled wire around a ³⁄₁₆" outside diameter×⅟16 inside diameter; high-permeability powdered-iron toroid core. The blocking oscillator frequency is approximately 18 kHz during operation. Blocking oscillator is supplied with power from a rechargeable power source 39. The oscillator boosts voltage up to 3 volts pulsed direct current (DC) which is rectified by diode 58, filtered by electrolytic capacitor 51 and regulated by zener diode 73 to provide the required source power for sensors, controller integrated circuit 74 and radio frequency (RF) module 80.

Figure 3A:
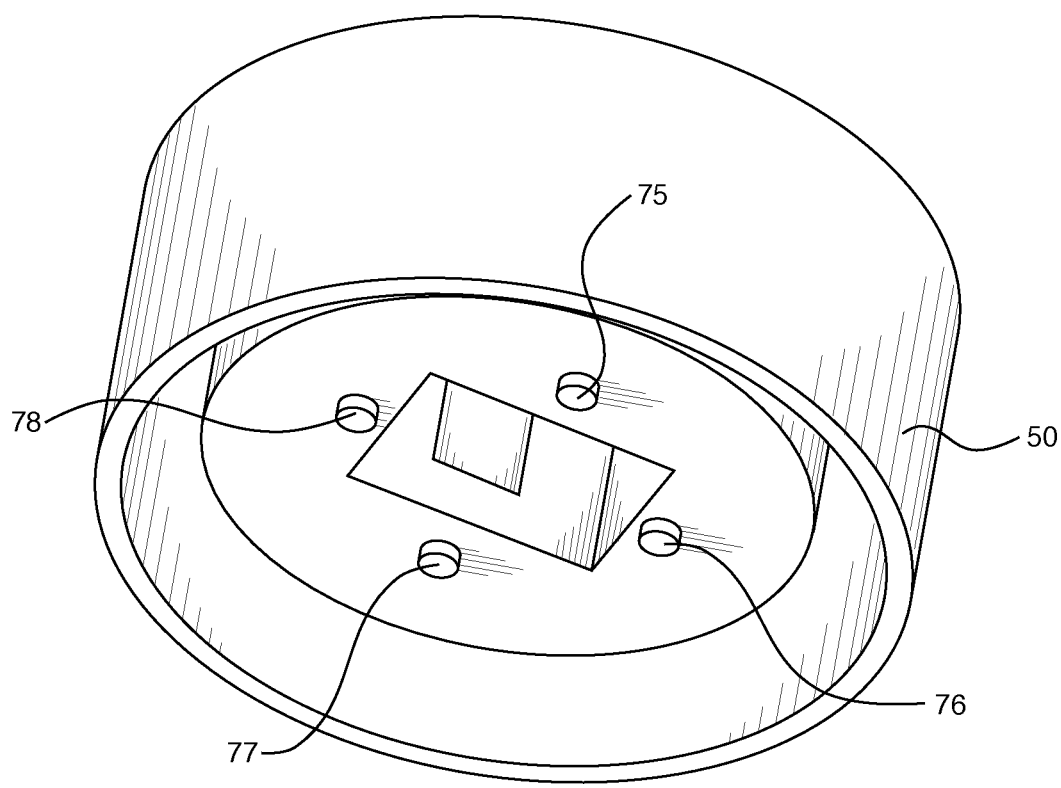
FIG. 3A shows an isometric view of a four element Hall sensor array of the first embodiment.

Additionally, as shown in FIGS. 5, 5A, 5B the generator AC output from coils 23 are sent into limiting resistor 79, then as input 60 to pin 82 of controller integrated circuit 74 as shown in FIG. 5A, to be used by said integrated circuit to calculate wind speed based on said generator's output AC frequency. As shown in FIG. 3A, wind direction is sensed by way of four analog Hall effect sensors 75, 76, 77 and 78 mounted in and around the inner circumference of upper mounting base 50 as shown in FIGS. 3A and 3.

Said Hall effect sensors are aligned with and activated by magnet 53 mounted in a single location within lower base support 51 and spaced at a distance and positioned for optimal activation of said Hall effect sensors. Lower support 51 is mounted into position on a standard ⅜" diameter 4 foot long steel rod (not shown) by way of base fixing screw 52, whereby the lower base support is aligned and fixed to a true North heading. Variable voltages of said Hall effect sensors are outputted through wires 60 and fed as quadrature inputs 83, 84, 85 and 86 of controller integrated circuit 74 as shown in FIG. 3 for calculating wind direction.

Referring to FIG. 3, Hall effect sensor wires 60 pass through opening 65 in body 30, and as shown in FIG. 2, through hole 32 in second stator plate 22 then through hole 33 in component plate 24 then into circuit board 36. Humidity sensor 68 is exposed to the elements to detect changes in humidity as shown in FIG. 3. The humidity sensor output wires pass through opening 69 in body 30 and as shown in FIG. 2, pass through opening 70 in second stator plate then through opening 71 in component plate and connected as shown in schematic diagram FIG. 5A, fed as input pin 87 to controller integrated circuit 74. Additionally, as shown in FIG. 3, temperature sensor 72 is located directly on circuit board 36. Aerodynamic dome 66 covers and protects circuit board 36, rechargeable power source 39 and includes vertical fin 67 to allow wind activated friction surfaces to align wind acceptor into prevailing winds to rotate shaft 11, FIG. 1.

Referring to FIG. 5A, temperature sensor output wires are connected to input 88 of controller integrated circuit 74. Data stream of said controller integrated circuit is sent and received in short packets from pin 90 to data input pin 91 of radio frequency (RF) module 80. Said RF module receives a power enable signal 92 from pin 81 of controller integrated circuit every second and is timed in-sync with a data packet into pin 91 to conserve stored power. RF signals from module connect to antenna 89, as shown in FIG. 3C, for communication with a remote monitoring device; such as a computer, tablet, phone or other RF capable device, located at a distance from the first embodiment for receiving and transmitting RF modulated with data for analysis, display and recording. In this first embodiment the communication system is low-power Bluetooth™, but could be any other unidirectional or bi-directional radio frequency (RF) communication method. Although this embodiment describes a configuration for a stand-alone weather station, it will be apparent to anyone skilled in the arts that our invention can be configured for any self-powered remote sensing tasks.

A second embodiment shown in FIGS. 2, 4, 5B is configured as a night-light using illumination LED 40. Said LED is powered as shown in schematic diagram FIG. 5B, by utilizing currents from rechargeable power source 39, regulated by forward biased LED 53, routed through current limiting resistor 91 into blocking oscillator consisting of oscillator coil 92, transistor 93 and bias resistor 94 to provide enough voltage to operate illumination LED 40. In this embodiment, oscillator coil 92 consists of 35 turns each for primary and secondary, winding using #30 copper enameled wire around a 3/16" outside diameter×1/16 inside diameter high-permeability powdered-iron toroid core. Blocking oscillator frequency is approximately 18 kHz during operation. Said blocking oscillator includes a light dependent resistor (LDR) 31 for turning off said light during daytime, thus conserving stored rechargeable power. During the day, LDR 31 as shown in schematic diagram FIG. 5B changes to a low resistance and will keep illumination LED 40 turned off by clamping voltage across transistor 93 base and emitter, thus providing additional charging currents into rechargeable power source 39 while the illumination LED 40 is off.

As shown in FIG. 5B schematic diagram, at dusk or low light conditions and through the night said LDR will exhibit a high resistance and allow transistor 93 to turn on, thus powering the illumination LED 40 from stored currents from rechargeable power source 39 and additional (if available) wind generated currents. Referring to FIG. 4, transparent aerodynamic dome 72 provides protection from the outside elements, covering rechargeable power source 39, circuit board 36 and LED 40. Said aerodynamic dome is fixed into position over component plate 24, FIG. 2. Three tests of our generator were conducted in a controlled environment using a room fan, wind speed gauge, amperage meter and voltage meter. A first test in a wind speed of 5 MPH the unloaded, open-circuit generator output measured 15.6 Volts AC peak-to-peak. In a second test using the same method as the first, current measurements were recorded using a 10 mA load with an amperage meter connected in series with the output of shunt regulator LED 53 and a 1.2 Volt 3000 mA Nickel-Metal-Hydride (NiMH) rechargeable battery used as a rechargeable power source 39.

Shunt regulator LED 53 begins to conduct at 1.65 Volts. This is 0.5 Volts under the battery's maximum charge voltage and used as a regulator in our circuit to prevent overcharging of said battery during high-wind conditions. A white LED was used as a load, drawing 10 mA. In a third test, using the same method as the first and second; voltage measurements were recorded using a 2.7 Volt/100 Farad super-capacitor as the rechargeable power source 39 and eliminating shunt regulator LED 53, while using a white LED as a 10 mA load. The results of these tests are seen in chart FIG. 6. It will be apparent to anyone skilled in the arts that our invention can be configured to utilize either a conventional chemical battery or a Super Capacitor as its rechargeable power source.

Advantages of the Present Invention

The present invention has a positive impact on low-wind applications for the energy industry; the invention incorporates a generator designed to produce AC currents converted from low wind energy by rotating magnets in close proximity to sets of coils positioned in opposition to each other. The invention provides generated currents which are full-wave rectified, filtered, and regulated before being directed into an internal rechargeable power source for storage and re-use. This rechargeable power source provides energy to drive internal power-consuming circuits.

Several advantages to the present invention are described herein. For example,
1. The invention operates from wind speeds as low as 5 miles per hour (breeze conditions) to generate AC power;
2. The invention supports local, self-powered sensors, microprocessor, communication and lighting application;
3. Silent operation of our invention reduces environmental impact noise; and
4. Our invention may alternately use a "Super Capacitor" instead of chemical batteries resulting in a maintenance-free design, thus increasing the lifetime of the invention while reducing landfill impact on the environment.

We claim:
1. A low-wind operated generator comprising:
a. a first stator plate including a single-phase stator coil wiring with a first set of at least two or more air-core coils wired in series and out of phase with each other and a second stator plate including a single-phase stator coil wiring with a second set of at least two or more air-core coils wired in series and out of phase with each other, wherein the first set of at least two or more air-core coils and the second set of at least two or more air-core coils are aligned and face one another;
b. a rotor, positioned in-between the first stator plate and the second stator plate and affixed to a shaft, the rotor having at least two or more magnets with poles aligned facing in a same direction such that all north poles face the first set of at least two or more air-core coils and all south poles face the second set of at least two or more air-core coils; and
c. a wind acceptor comprised of a plurality of friction surfaces arranged around an axis and affixed to said shaft to generate power in the single-phase stator coil wiring.
2. The low-wind operated generator of claim 1, wherein the generated power is used for charging a local rechargeable source of primary power.
3. The low-wind operated generator of claim 1, wherein the generated power is used for powering local sensors, microprocessors and radio frequency transceivers from a local rechargeable source of primary power.
4. The low-wind operated generator of claim 1, wherein the generated power is used for powering a light emitting diode (LED) from a local rechargeable source of primary power, locally.

* * * * *